United States Patent
Kleyman et al.

(10) Patent No.: US 12,484,965 B2
(45) Date of Patent: Dec. 2, 2025

(54) SYSTEMS AND METHODS FOR PREDICTING SURGICAL OUTCOMES

(71) Applicant: Mazor Robotics Ltd., Caesarea (IL)

(72) Inventors: Leonid Kleyman, Atzmon (IL); Ofer Regev, Hinanit (IL); Adi Sandelson, Givatayim (IL); Adam D. Glaser, Germantown, TN (US); Shane Lars Riding, Cordova, TN (US)

(73) Assignee: Mazor Robotics Ltd., Caesarea (IL)

( * ) Notice: Subject to any disclaimer, the term of this patent is extended or adjusted under 35 U.S.C. 154(b) by 784 days.

(21) Appl. No.: 17/163,924

(22) Filed: Feb. 1, 2021

(65) Prior Publication Data
US 2022/0241014 A1    Aug. 4, 2022

(51) Int. Cl.
*A61B 34/10*    (2016.01)
*G06N 3/08*    (2023.01)

(52) U.S. Cl.
CPC ............... *A61B 34/10* (2016.02); *G06N 3/08* (2013.01); *A61B 2034/102* (2016.02)

(58) Field of Classification Search
CPC ... A61B 34/10; A61B 2034/105; A61B 34/20; A61B 2034/104; A61B 2034/108; A61B 2034/102; A61B 2034/252; A61B 1/317; A61B 17/15; A61B 34/30; A61B 2034/107; G16H 20/40; G16H 30/40; G06T 2207/30008; G06T 2210/41; G06T 7/00; G06T 2207/30004; G06T 7/0012; G06T 7/0016; G06T 2207/10016; G06T 2207/10116; G06T 2207/30052; G06N 3/08; G06N 7/01
See application file for complete search history.

(56) References Cited

U.S. PATENT DOCUMENTS

| | | | |
|---|---|---|---|
| 6,212,510 B1 * | 4/2001 | Brand | G06V 40/23 706/14 |
| 9,642,633 B2 | 5/2017 | Frey et al. | |
| 9,700,739 B2 | 7/2017 | Martin et al. | |
| 9,734,632 B2 | 8/2017 | Thomas et al. | |

(Continued)

FOREIGN PATENT DOCUMENTS

| | | |
|---|---|---|
| CN | 110559087 | 12/2019 |
| JP | 2019-523686 | 8/2019 |

(Continued)

*Primary Examiner* — Sumati Lefkowitz
*Assistant Examiner* — Aaron Joseph Sorrin
(74) *Attorney, Agent, or Firm* — Sheridan Ross P.C.

(57) ABSTRACT

Systems and methods for predicting surgical outcomes are provided. A surgical plan comprising information about a planned surgery and at least one preoperative image depicting a planned surgical result and at least one postoperative image depicting an actual surgical result resulting from execution of the planned surgery may be received. The postoperative image may be registered to the preoperative image. One or more features may be automatically identified in each of the postoperative image and the preoperative image. A difference may be automatically measured in at least one parameter of each of the one or more features to yield training data. A function for predicting the difference may be generated using artificial intelligence and based on the training data. The function may be applied to an unexecuted surgical plan.

17 Claims, 3 Drawing Sheets

(56) References Cited

U.S. PATENT DOCUMENTS

| | | |
|---|---|---|
| 10,292,770 B2 | 5/2019 | Ryan et al. |
| 10,347,380 B2 | 7/2019 | Miller et al. |
| 2011/0098566 A1 | 4/2011 | Blomqvist et al. |
| 2017/0333138 A1 | 11/2017 | Arata et al. |
| 2019/0099221 A1 | 4/2019 | Schmidt et al. |
| 2019/0231432 A1 | 8/2019 | Amanatullah |
| 2020/0015894 A1 | 1/2020 | Bor et al. |
| 2020/0138361 A1 | 5/2020 | Amiot et al. |
| 2020/0188026 A1* | 6/2020 | de Souza .............. G06T 7/0016 |
| 2020/0229870 A1 | 7/2020 | Sarangapani et al. |
| 2020/0268461 A1 | 8/2020 | Forstein et al. |
| 2020/0315708 A1 | 10/2020 | Mosnier et al. |
| 2020/0405395 A1* | 12/2020 | Gullotti .............. A61B 17/7082 |
| 2021/0015560 A1* | 1/2021 | Boddington ........... G16H 50/70 |
| 2021/0145519 A1* | 5/2021 | Mosnier ............. A61B 17/7077 |
| 2021/0391058 A1* | 12/2021 | Kostrzewski .......... G16H 20/40 |

FOREIGN PATENT DOCUMENTS

| | | | |
|---|---|---|---|
| JP | 2020-062494 | 4/2020 | |
| WO | WO 2020/033319 | 2/2020 | |
| WO | WO-2020033319 A1 * | 2/2020 | ............. A61B 34/10 |
| WO | WO-2020037308 A1 * | 2/2020 | ............. A61B 34/10 |
| WO | WO 2020/123701 | 6/2020 | |
| WO | WO-2020163355 A1 * | 8/2020 | ............. A61B 34/10 |
| WO | WO-2020180566 A1 * | 9/2020 | ............. G06N 20/10 |

\* cited by examiner

SYSTEMS AND METHODS FOR PREDICTING SURGICAL OUTCOMES

FIELD

The present technology is related generally to predicting surgical outcomes and more particularly, to determining a function to predict surgical outcomes based on measured differences in preoperative image(s) and postoperative image(s).

BACKGROUND

Planning one or more surgical steps for a surgical plan is based on several factors and inputs including patient specific parameter(s) and a surgeon's preference(s). Surgeons may select specific tools and/or instruments to be used with the surgical plan. The types of tools, instruments, and inputs may affect one or more outcomes resulting from executing the surgical plan.

SUMMARY

Example aspects of the present disclosure include:

A method for predicting surgical outcomes according to at least one embodiment of the present disclosure comprises receiving, by a processor, a surgical plan comprising information about a planned surgery and at least one preoperative image depicting a planned surgical result; receiving, by the processor, at least one postoperative image depicting an actual surgical result resulting from execution of the planned surgery; registering, by the processor, the postoperative image to the preoperative image; automatically identifying, by the processor, one or more features in each of the postoperative image and the preoperative image; automatically measuring, by the processor, a difference in at least one parameter of each of the one or more features to yield training data, the difference measured between the preoperative image and the postoperative image; generating, by the processor, using artificial intelligence and based on the training data, a function for predicting the difference; and applying, by the processor, the function to an unexecuted surgical plan.

Any of the aspects herein, wherein the applying comprises predicting, by the processor, an expected difference between a planned surgical result described in the unexecuted plan and an actual surgical result resulting from execution of the unexecuted plan.

Any of the aspects herein, further comprising: generating, by the processor, a notification based on the expected difference, the notification being at least one of an audible notification or a visual notification.

Any of the aspects herein, further comprising: updating, by the processor, the unexecuted plan based on the expected difference.

Any of the aspects herein, further comprising: generating, by a processor, a notification based on the updated plan, the notification including a prompt to accept or decline at least one change in the updated plan.

Any of the aspects herein, wherein the unexecuted plan is automatically updated based on pre-authorized historical plans, the historical plans having at least one surgical step substantially similar to at least one change in the updated unexecuted plan.

Any of the aspects herein, wherein the measuring includes automatically determining the at least one parameter based on the surgical plan.

Any of the aspects herein, wherein the measuring includes automatically identifying at least one location to measure the difference on the one or more features in each of the preoperative image and the postoperative image.

Any of the aspects herein, wherein the identifying uses at least one of feature recognition or segmentation.

Any of the aspects herein, wherein the one or more features comprises at least one of one or more implants or one or more anatomical elements.

Any of the aspects herein, wherein the at least one parameter is at least one of a position or an orientation of at least one of one or more implants or one or more tools.

Any of the aspects herein, wherein the at least one parameter is a plurality of parameters and further comprising: determining, using artificial intelligence and the training data, at least one unessential parameter to remove from the plurality of parameters, wherein each of the at least one unessential parameter does not affect a result of the function.

Any of the aspects herein, further comprising: determining, using artificial intelligence and the training data, a weight for each parameter of the at least one parameter.

Any of the aspects herein, wherein the function is based on a plurality of inputs.

Any of the aspects herein, wherein the registering includes overlaying a depiction of the one or more features from the at least one postoperative image over a depiction of the one or more features from the at least one preoperative image.

A method for predicting surgical outcomes according to at least one embodiment of the present disclosure comprises receiving, by a processor, at least one preoperative image depicting a planned surgical result and at least one postoperative image depicting an actual surgical result; identifying, by the processor, one or more features in each of the postoperative image and the preoperative image; overlaying, by the processor, the one or more features of the at least one preoperative image over the one or more features of the at least one postoperative image; measuring, by the processor, a difference in at least one parameter corresponding to each of the one or more features to yield training data, the difference measured between the preoperative image and the postoperative image; generating, by the processor using artificial intelligence and based on the training data, a function for predicting the difference; and predicting, by the processor using the function and based on an unexecuted surgical plan, an expected difference between a planned surgical result described in the unexecuted plan and an actual surgical result resulting from execution of the unexecuted plan.

Any of the aspects herein, further comprising: updating, by the processor, the unexecuted plan based on the expected difference.

Any of the aspects herein, further comprising: generating, by a processor, a notification based on the updated plan, the notification including a prompt to accept or decline at least one change in the updated plan.

Any of the aspects herein, wherein the unexecuted plan is automatically updated based on pre-authorized historical plans, the historical plans having at least one surgical step substantially similar to at least one change in the updated unexecuted plan.

A system for determining a function for predicting surgical outcomes according to at least one embodiment of the present disclosure comprises at least one processor; and at least one memory storing instructions for execution by the at least one processor that, when executed, cause the at least one processor to: receive a surgical plan comprising information about a planned surgery and at least one preoperative image depicting a planned surgical result; receive at least one postoperative image depicting an actual surgical result resulting from execution of the planned surgery; register the postoperative image to the preoperative image; identify one or more features in each of the postoperative image and the preoperative image; measure a difference in at least one parameter of each of the one or more features to yield training data, the difference measured between the preoperative image and the postoperative image; generate, using artificial intelligence and based on the training data, a function for predicting the difference; and predict, using the function and based on an unexecuted surgical plan, an expected difference between a planned surgical result described in the unexecuted plan and an actual surgical result resulting from execution of the unexecuted plan.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present invention will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
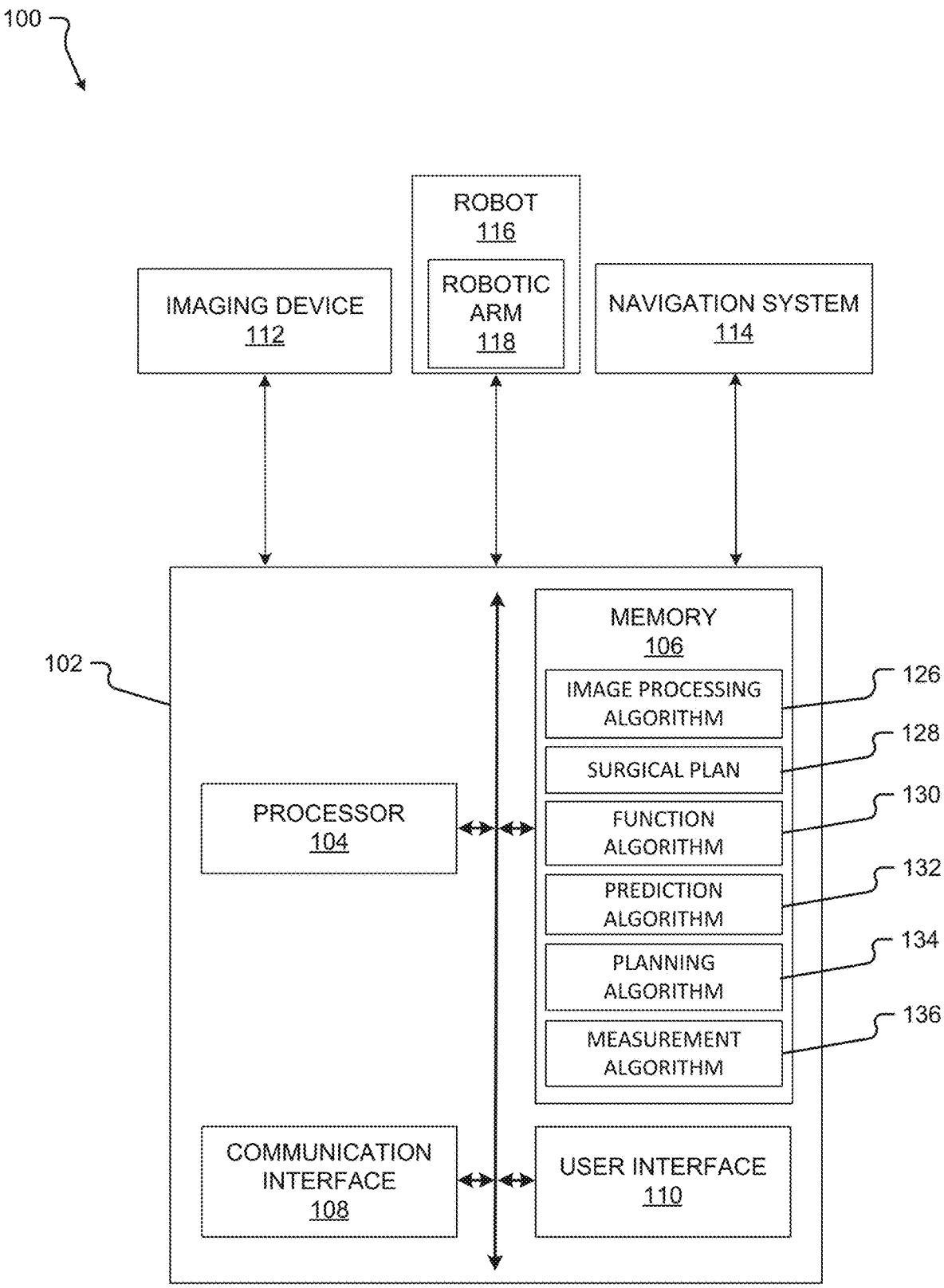
FIG. 1 is a block diagram of a system according to at least one embodiment of the present disclosure.

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device and/or a medical device.

In one or more examples, the described methods, processes, and techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors (e.g., Intel Core i3, i5, i7, or i9 processors; Intel Celeron processors; Intel Xeon processors; Intel Pentium processors; AMD Ryzen processors; AMD Athlon processors; AMD Phenom processors; Apple A10 or 10X Fusion processors; Apple A11, A12, A12X, A12Z, or A13 Bionic processors; or any other general purpose microprocessors), graphics processing units (e.g., Nvidia GeForce RTX 2000-series processors, Nvidia GeForce RTX 3000-series processors, AMD Radeon RX 5000-series processors, AMD Radeon RX 6000-series processors, or any other graphics processing units), application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Image registration is the process of transforming different sets of data into one coordinate system. The data may be, for example, multiple photographs, data from different sensors, times, depths, or viewpoints.

Surgical planning software enables planning and executing positioning of instruments (e.g., screws, rods, pins, intervertebral bodies) in a spinal region of a patient. The software enables a user (i.e., a surgeon) to preoperatively plan one or more screw placements and/or trajectories on different imaging modalities (i.e., X-ray, computed tomography, ultrasound, etc.). The software uses image processing methodologies to match different image sets of the same patient to each other. Thus, the software can be used to match or register postoperative scans of a patient to images from a preoperative plan and measure an accuracy of the placement of instruments such as the screws.

Embodiments of the present disclosure include registering postoperative image(s) to preoperative image(s), performing image recognition of implants and their features in the postoperative imaging, and performing image-based 3D measurement(s) of difference(s) between the preoperative plan and the executed plan. A function may be determined from these differences and can be used to predict a procedural outcome of a different unexecuted plan. The function may also be used to guide a user on a selection of instrument(s) and/or tool(s) given a clinical situation, and tailor a surgical plan accordingly.

Embodiments of the present disclosure provide technical solutions to one or more of the problems of (1) quantifying an accuracy of at least one surgical instrument positioned during a surgical procedure compared to a planned position of the at least one surgical instrument; (2) predicting an accuracy of an outcome of a surgical plan; (3) increasing an effectiveness of a future surgical procedure by generating at least one change to the surgical plan based on predicting an accuracy of an outcome of the surgical plan; and (4) increasing an effectiveness of a future surgical procedure by generating at least one recommendation regarding surgical tool and/or instrument selection.

Turning first to FIG. 1, a block diagram of a system 100 according to at least one embodiment of the present disclosure is shown. The system 100 may be used to process image data; execute a function algorithm 130, a prediction algorithm 132, a planning algorithm 134, a measurement algorithm 136, and/or an image processing algorithm 126; and/or carry out other aspects of one or more of the methods disclosed herein. The system 100 comprises a computing device 102, one or more imaging devices 112, a navigation system 114, and/or a robot 116. Systems according to other embodiments of the present disclosure may comprise more or fewer components than the system 100. For example, the system 100 may not include the imaging device 112, the navigation system 114, and/or the robot 116.

The computing device 102 comprises a processor 104, a memory 106, a communication interface 108, and a user interface 110. Computing devices according to other embodiments of the present disclosure may comprise more or fewer components than the computing device 102.

The processor 104 of the computing device 102 may be any processor described herein or any similar processor. The processor 104 may be configured to execute instructions stored in the memory 106, which instructions may cause the processor 104 to carry out one or more computing steps utilizing or based on data received from the imaging device 112, the robot 116, and/or the navigation system 114. The processor 104 may also be configured to automatically execute any steps of the method 300.

The memory 106 may be or comprise RAM, DRAM, SDRAM, other solid-state memory, any memory described herein, or any other tangible, non-transitory memory for storing computer-readable data and/or instructions. The memory 106 may store information or data useful for completing, for example, any step of the method 300 described herein. The memory 106 may store, for example, one or more image processing algorithms 126, one or more function algorithms 130, one or more prediction algorithms 132, one or more planning algorithms 134, one or more measurement algorithms 136, and/or one or more surgical plans 128. Such algorithms may, in some embodiments, be organized into one or more applications, modules, packages, layers, or engines. The algorithms may cause the processor 104 to manipulate data stored in the memory 106 and/or received from the imaging device 112, the robot 116, and/or the navigation system 114.

The computing device 102 may also comprise a communication interface 108. The communication interface 108 may be used for receiving image data or other information from an external source (such as the imaging device 112, the navigation system 114, and/or the robot 116), and/or for transmitting instructions, images, or other information to an external system or device (e.g., another computing device 102, the navigation system 114, the imaging device 112, and/or the robot 116). The communication interface 108 may comprise one or more wired interfaces (e.g., a USB port, an ethernet port, a Firewire port) and/or one or more wireless interfaces (configured, for example, to transmit information via one or more wireless communication protocols such as 802.11a/b/g/n, Bluetooth, NFC, ZigBee, and so forth). In some embodiments, the communication interface 108 may be useful for enabling the device 102 to communicate with one or more other processors 104 or computing devices 102, whether to reduce the time needed to accomplish a computing-intensive task or for any other reason.

The computing device 102 may also comprise one or more user interfaces 110. The user interface 110 may be or comprise a keyboard, mouse, trackball, monitor, television, touchscreen, headset, and/or any other device for receiving information from a user and/or for providing information to a user. In some embodiments, the user interface 110 may receive information and/or commands from a user via voice activation. In other embodiments, the user interface 110 may incorporate augmented reality or virtual reality. The user interface 110 may be used, for example, to receive a user selection or other user input regarding receiving a surgical plan comprising information about a planned surgery and at least one preoperative image depicting a planned surgical result; to receive a user selection or other user input regarding receiving at least one postoperative image depicting an actual surgical result resulting from execution of the planned surgery; to receive a user selection or other user input regarding registering the postoperative image to the preoperative image; to receive a user selection or other user input regarding overlaying, by the processor, the one or more features of the at least one preoperative image over the one or more features of the at least one postoperative image (or vice versa); to receive a user selection or other user input regarding automatically identifying one or more features in each of the postoperative image and the preoperative image; and/or to receive a user selection or other user input regarding automatically measuring, by the processor, a difference in at least one parameter of each of the one or more features to yield training data, the difference measured between the preoperative image and the postoperative image.

The user interface 110 may also be used, for example, to receive a user selection or other user input regarding generating, by the processor, using artificial intelligence and based on the training data, a function for predicting the difference; to receive a user selection or other user input regarding applying, by the processor, the function to an unexecuted surgical plan; to receive a user selection or other user input regarding predicting, by the processor, an expected difference between a planned surgical result described in the unexecuted plan and an actual surgical result resulting from execution of the unexecuted plan; to receive a user selection or other user input regarding generating, by the processor, a notification based on the expected difference, the notification being at least one of an audible notification or a visual notification; to receive a user selection or other user input regarding updating, by the processor, the unexecuted plan based on the expected difference; to receive a user selection or other user input regarding generating, by a processor, a notification based on the updated plan, the notification including a prompt to accept or decline at least one change in the updated plan; to receive a user selection or other user input regarding determining, using artificial intelligence and the training data, at least one unessential parameter to remove from the plurality of parameters, wherein each of the at least one unessential parameter does not affect a result of the function; to receive a user selection or other user input regarding determining, using artificial intelligence and the training data, a weight for each parameter of the at least one parameter; and/or to display the images, and/or the surgical plan 128. In some embodiments, the user interface 110 may be useful to allow a surgeon or other user to modify the plan 128, or other information displayed, though it will be appreciated that each of the preceding inputs may be generated automatically by the system 100 (e.g., by the processor 104 or another component of the system 100) or received by the system 100 from a source external to the system 100. In some embodiments, user input such as that described above may be optional or not needed for operation of the systems, devices, and methods described herein.

Although the user interface 110 is shown as part of the computing device 102, in some embodiments, the computing device 102 may utilize a user interface 110 that is housed separately from one or more remaining components of the computing device 102. In some embodiments, the user interface 110 may be located proximate to one or more other components of the computing device 102, while in other embodiments, the user interface 110 may be located remotely from one or more other components of the computer device 102.

The imaging device 112 may be capable of taking a 2D image or a 3D image to yield an image and/or image data. The image may be obtained prior to or preoperatively, during or intra-operatively, or after or postoperatively a surgical procedure. "Image data" as used herein refers to the data generated or captured by an imaging device, including in a machine-readable form, a graphical form, and in any other form. The imaging device 112 may be or comprise, for example, a camera or a CT scanner, but may also be or comprise a fluoroscope, an ultrasound probe, an O-arm, a C-arm, a G-arm, any other device utilizing X-ray-based imaging, a magnetic resonance imaging (MRI) scanner, an optical coherence tomography scanner, an endoscope, a microscope, a thermographic camera (e.g., an infrared camera), or any other imaging device suitable for obtaining images or image data corresponding to an anatomical feature of a patient or an object.

The navigation system 114 may provide navigation for a surgeon and/or a surgical robot during an operation. The navigation system 114 may be any now-known or future-developed navigation system, including, for example, the Medtronic StealthStation™ S8 surgical navigation system. The navigation system 114 may include a camera or other sensor(s) for tracking one or more reference markers or other objects within the operating room or other room where a surgery takes place. In various embodiments, the navigation system 114 may be used to track a position of the imaging device 112 (or, more particularly, of a navigated reference marker attached, directly or indirectly, in fixed relation to the imaging device 112) and/or of the robot 116 (or, more particularly, of a navigated reference marker attached, directly or indirectly, in fixed relation to the robot 116). The navigation system 114 may include a display for displaying one or more images from an external source (e.g., the computing device 102, the imaging device 112, or other source) or a video stream from the camera or other sensor of the navigation system 114. In some embodiments, the system 100 can operate without the use of a navigation system 114.

The robot 116 may be any surgical robot or surgical robotic system. The robot 116 may be or comprise, for example, the Mazor X™ Stealth Edition robotic guidance system. The robot 116 may comprise one or more robotic arms 118. In some embodiments, the robotic arm 118 may comprise a plurality of robotic arms, though the robot 116 may comprise one robotic arm, two robotic arms, or more than two robotic arms. The robotic arm 118 may be used to selectively hold and/or operate one or more imaging devices 112, and/or any other tool or instrument.

In some embodiments, the robotic arm 118 has at least five degrees of freedom. In other embodiments, the robotic arm 118 has at least six degrees of freedom. In yet other embodiments, the robotic arm 118 has fewer than five or greater than six degrees of freedom. The robotic arm 118 (and/or a base of the robot 116) may also have three dimensions of orientation. The combination of multiple degrees of freedom and multiple dimensions of orientation allows for the robotic arm 118 to move to any pose. In other words, the robotic arm 118 is not limited to a fixed area and can move in any direction. Further, in some embodiments, the robot 116 can move during a surgical procedure to position the robotic arm 118 (and thus, the imaging device 112).

Reference markers may be placed on the robot 116, the robotic arm 118, the imaging device 112, and/or any other object in the surgical space. The reference markers may be tracked by the navigation system 114, and the results of the tracking may be used by the robot 116 and/or by an operator of the system 100 or any component thereof. As described above, in some embodiments, the navigation system 114 can be used to track other components of the system 100 (e.g., the imaging device 112) and the system 100 can operate without the use of the robot 116 (e.g., with the surgeon manually manipulating the imaging device 112).

Figure 2A:
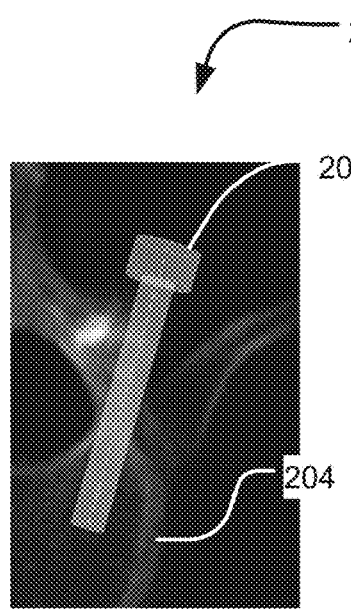
FIG. 2A is an example X-ray image.

Turning to FIG. 2A, a first X-ray image 200 is shown. In the illustrated embodiment, the first X-ray image 200 depicts a portion of a vertebra 204 and a planned pedicle screw outline with an axis 206 (hereinafter "the planned pedicle screw 206"). In other embodiments, the first image 200 may depict any number or type of anatomical element(s), instrument(s), and/or tool(s), including any type of spinal screw(s). The first image 200 may be obtained preoperatively or intra-operatively (e.g., prior to insertion of a tool or instrument) by an imaging device such as the imaging device 112. The first image 100 may also be obtained as input via a user interface such as the user interface 110. In some embodiments, the planned pedicle screw 206 may be positioned via an input received by the user interface 110. In other embodiments, the planned pedicle screw 206 may be positioned automatically by a processor such as the processor 104 executing a planning algorithm such as the planning algorithm 134. In further embodiments, the planned pedicle screw 206 may initially be positioned automatically by the processor 104 executing the planning algorithm 134 and thereafter a user may adjust the positioning of the planned pedicle screw 206.

Figure 2B:
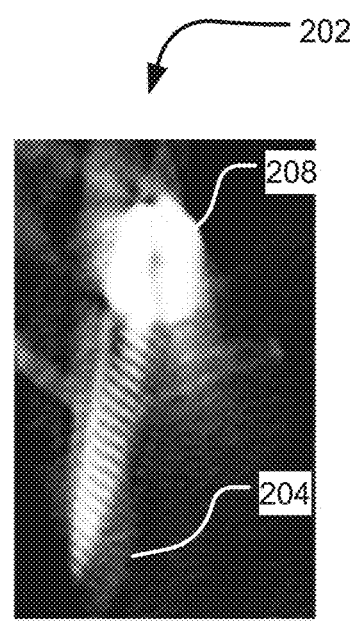
FIG. 2B is an example X-ray image.

Turning to FIG. 2B, a second X-ray image 202 is shown. In the illustrated embodiment, a second image 202 depicts the portion of the vertebra 204 and an implanted pedicle screw 208 postoperatively. The second image 202 is obtained from the same patient that the first image 200 is obtained from. In other embodiments, the second image 202 may depict any number or type of anatomical element(s), instrument(s), and/or tool(s), including any type of spinal screw(s). The instrument(s) and/or tool(s) depicted may be the screw, a pin, a drill bit, a rod, or any other instrument or tool. The second image 202 may be obtained intra-operatively (and after insertion of a tool or instrument) or postoperatively by the imaging device 112. The imaging device 112 used to obtain the second image 202 may be different from the imaging device 112 used to obtain the first image 100. The second image 202 may also be obtained as input via the user interface 110.

Figure 2C:
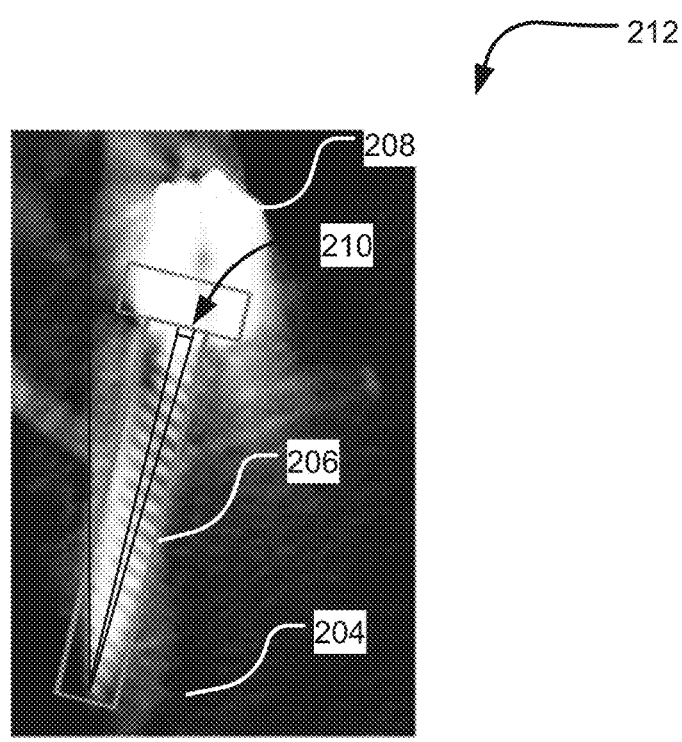
FIG. 2C is an example image consisting of the X-ray image of FIG. 2B overlaid onto the X-ray image of FIG. 2A.

Turning to FIG. 2C, an image 212 is shown in which the first image 200 is overlaid onto the second image 202. In other embodiments, the second image 202 may be overlaid on the first image 200. As will be described in more detail below, the first image 200 may be registered to the second image 202 or vice versa, or the images 200 and 202 may otherwise be matched to each other. Overlaying the first image 200 onto the second image 202 may include identifying and matching one or more features in each of the first image 200 and the second image 202. The overlaying may then include aligning each feature in the first image 200 to the second image 202. The one or more features may include any anatomical element(s), tool(s), and/or instrument(s) that appear in both the first image 200 and the second image 202. Any anatomical element(s), tool(s), and/or instrument(s) that are known to have moved between the time the first image 200 was taken and the time the second image 202 was taken may be excluded from the one or more features. When the overlay is complete, a measurement 210 of one or more parameters may be obtained automatically using a measurement algorithm such as the measurement algorithm 136 or by user input received via the user interface 110. For example, as illustrated, the parameter is an angle of each of the screw 208 and the planned pedicle screw 206 (which may be defined relative to a dimension of the image 212 or any other predetermined dimension or axis) and the measurement 210 is a difference between each angle. The one or more parameters may include, for example, a distance between an entry point and a pedicle base, a depth of insertion, an angle, or the like.

The measured differences may correlate to an accuracy of an outcome. For example, a lower measured difference may be interpreted as a more successful or more accurate screw placement. Further, a threshold may be determined to define such outcomes. In some embodiments, the threshold may be used to define one or more classifications and the one or more classifications may correlate to a range of success. For example, if a measured difference is lower than a threshold, then the actual surgical result may be classified as a successful surgical procedure. The measured differences may also be used to generate and provide to a user a probability of success. In some embodiments, the probability of success may be a probability of success for the entire surgical procedure. In other embodiments, the probability of success may be a probably of success for one or more steps (for example, a probability of success for each trajectory of a plurality of trajectories). In additional embodiments, the probably of success may include both a probability of success for the entire procedure and a probability of success for one or more steps. In some embodiments, the probability of success may be a percentage (e.g., 95%, 99%, etc.). In other embodiments, the probably of success may be a scale (e.g., Green, Yellow, Red; scale of 1 to 10; go/no-go, etc.).

Based on these measured differences, the measurements 210 may be used as training data to generate a function that may predict an expected difference in measurements of an unexecuted surgical plan. Any form of artificial intelligence or machine learning may be used by a function algorithm such as the function algorithm 130 to generate the function based on the training data. The function may be applied to an unexecuted surgical plan by a prediction algorithm such as the prediction algorithm 132 to predict the expected difference. The expected difference may be automatically compared to a predetermined threshold by the prediction algorithm 132 to classify or otherwise define the expected outcome based on the expected difference, as will be described in more detail below.

In some embodiments, the robotic arm 118 (or any component of the system 100) may provide a compensation to avoid potential issues during execution of the plan. The compensation may be, for example, adjusting at least one parameter of the robotic arm 118 or any component of the system 100. The potential issue may be identified in the unexecuted plan. For example, if skiving is detected or identified as a potential issue in an unexecuted plan, the robotic arm 118 may adjust an applied force and/or adjust a position and/or orientation of a tool to reduce or avoid skiving during execution of the plan. This may occur without notifying the user. In other words, the unexecuted surgical plan may identify a potential issue and during execution of the surgical plan, the robotic arm 118 or any component of the system 100 may provide a compensation to avoid the potential issue without the user having knowledge of the potential issue and/or the compensation. The compensation may result in an increased accuracy of a result of the plan (e.g., increased accuracy of implant placement or the like).

Figure 3:
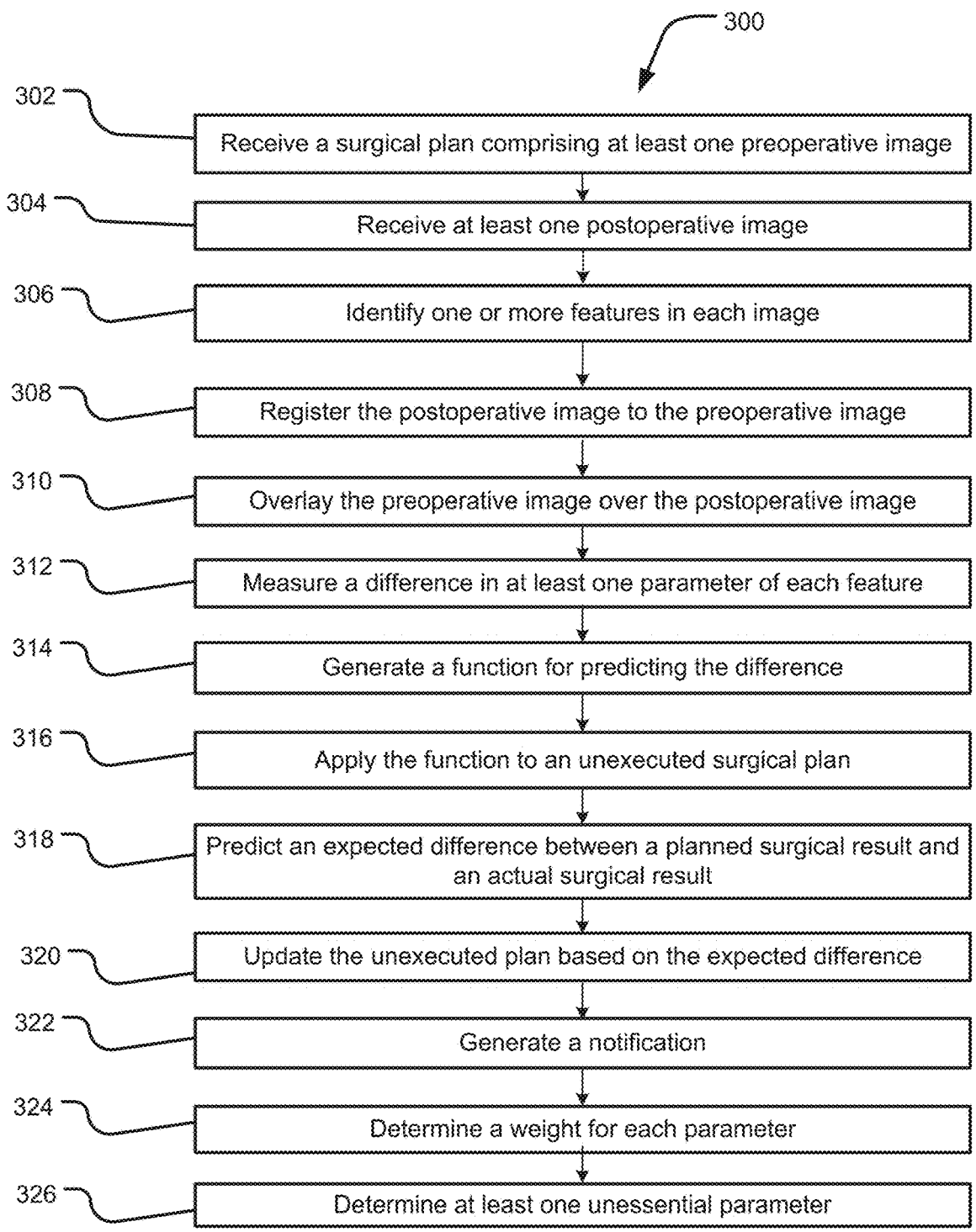
FIG. 3 is a flowchart of a method according to at least one embodiment of the present disclosure.

Turning now to FIG. 3, a method 300 for predicting a surgical outcome may be carried out or otherwise performed automatically, for example, by at least one processor. The at least one processor may be the same as or similar to the processor(s) 104 of the computing device 102 described above. The at least one processor may be part of a navigation system (such as a navigation system 114). A processor other than any processor described herein may also be used to execute the method 300. The at least one processor may perform the method 300 by executing instructions stored in a memory (such as the memory 106). The instructions may correspond to one or more steps of the method 300 described below.

The method 300 comprises receiving, by the processor, a surgical plan comprising information about a planned surgery and at least one preoperative image depicting a planned surgical result (step 302). The surgical plan may be the same as or similar to the surgical plan 128. The surgical plan may be received via a user interface such as the user interface 110 and/or a communication interface such as the communication interface 108 of a computing device such as the computing device 102, and may be stored in a memory such as the memory 106 of the computing device. The surgical plan may also be received from an external database or image repository (e.g., a hospital image storage system, such as a picture archiving and communication system (PACS), a health information system (HIS), and/or another system for collecting, storing, managing, and/or transmitting electronic medical records including image data), and/or via the Internet or another network. The surgical plan may also include information about one or more surgical steps involving at least one instrument and/or tool. The information may include information about a target trajectory and/or a target position and/or orientation of the at least one instrument and/or tool. The information may also include at least one dimension of an instrument, tool, and/or anatomical element.

The at least one preoperative image may be the same as or similar to the first image 200. The at least one preoperative image may be received or obtained from an imaging device such as the imaging device 112, which may be any imaging device such as a camera, X-ray based imaging device, or ultrasound imaging device. The at least one preoperative image may comprise one or more 2D images, one or more 3D images, or a combination of one or more 2D images and one or more 3D images. In some embodiments, one imaging device may be used to obtain the at least one preoperative image. In other embodiments, multiple imaging devices may be used to obtain the at least one preoperative image. In examples wherein more than one image is received or multiple images are used to construct a 3D image, a first imaging device may obtain a first one of the images independently of a second imaging device obtaining a second one of the images. In another example, at least a first one of the images may be obtained with a first imaging device and at least a second one of the images may be obtained with a second imaging device. In other embodiments, the image may be received via the user interface and/or via the communication interface of the computing device, and may be stored in the memory. The image may also be generated by and/or uploaded to any other component of a system such as the system 100. In some embodiments, the image may be indirectly received via any other component of the system or a node of a network to which the system is connected.

The image may be processed using an image processing algorithm such as the image processing algorithm 126 to identify one or more features in the image as will be described below. In some embodiments, feature recognition (using, e.g., an edge detection or other feature recognition algorithm) may be used to identify a feature of an anatomical element, a tool, and/or an instrument. For example, a contour of a vertebra, femur, or other bone may be identified in the image. In other embodiments, segmentation (using, e.g., a segmentation algorithm) may be used to identify an anatomical element in the image.

The preoperative image may include a depiction of the planned surgical result. The planned surgical result may include a depiction of a planned instrument and/or tool in a desired pose (e.g., position and orientation) with respect to at least one anatomical element. The planned instrument may be an implant such as a pedicle screw (e.g., the planned pedicle screw 206). The preoperative image and the surgical plan may also include information about a target pose of the planned instrument and/or tool. The information may include at least one dimension of the at least one anatomical element, the planned instrument, and/or the planned tool. As previously described, in some embodiments, the planned instrument and/or tool may be positioned via an input received by a user interface such as the user interface 110. In other embodiments, the planned instrument and/or tool may be positioned automatically by the processor executing a planning algorithm such as the planning algorithm 134. In further embodiments, the planned instrument and/or tool may initially be positioned automatically using the planning algorithm and a user may adjust the positioning of the planned instrument and/or tool.

Although the surgical plan of the step 302 is described as including at least one preoperative image, in some embodiments the at least one preoperative image may be an intraoperative image taken before a given surgical procedure or task, and used (for example) to plan the surgical procedure or task.

The method 300 also comprises receiving, at the processor, at least one postoperative image depicting an actual surgical result resulting from execution of the planned surgery (step 304). The at least one postoperative image may be the same as or similar to the second image 202. In some embodiments, the step 304 may be the same as step 302 with respect to receiving and/or processing the postoperative image. In other embodiments, the step 304 may be similar to step 302 with respect to receiving and/or processing the postoperative image.

The at least one postoperative image may be obtained intra-operatively (and after insertion of a tool or instrument or completion of some other surgical procedure or task) or postoperatively. The at least one postoperative image may depict at least a portion of an instrument and/or tool positioned within an anatomical element postoperatively. The anatomical element(s), instrument(s), and/or tool(s) correspond to the anatomical element(s), planned instrument(s), and/or planned tool(s) of the preoperative image received in step 302.

The method 300 also comprises automatically identifying, by the processor, one or more features in each of the postoperative image and the preoperative image (step 306). The one or more features may be one or more instruments, one or more anatomical elements, and/or one or more tools. The anatomical elements may be, for example, vertebrae.

The instruments may be, for example, pedicle screws. The identifying may use at least one of feature recognition or segmentation to identify the one or more features. For example, a contour of a vertebra may be identified as part of the vertebra or a thread of a pedicle screw may be identified as part of the screw.

The method 300 also comprises registering, by the processor, the postoperative image to the preoperative image (step 308). In some embodiments, registering the postoperative image to the preoperative image may be performed manually. The registration may correlate or generate a transformation between the preoperative image to the postoperative image in a common coordinate system. In some embodiments, the registration may utilize one or more additional images to correlate the preoperative image to the postoperative image. In other embodiments, the registration may be completed using only the preoperative image and the postoperative image. The preoperative image, postoperative image, and/or additional images may be obtained from different imaging devices (and may be obtained using different imaging modalities), times, depths, angles, or viewpoints from each other. The registration may be achieved by overlaying, as described below in step 310, in which case the step 308 and the step 310 may be accomplished simultaneously.

The method 300 further comprises overlaying, by the processor, the one or more features of the at least one preoperative image over the one or more features of the at least one postoperative image (step 310). The preoperative image may be automatically overlaid onto the postoperative image. Overlaying the preoperative image onto the postoperative image may include identifying and matching one or more features in each of the preoperative image and the postoperative image as described with respect to step 306. The overlaying may then include aligning each identified feature in the preoperative image and the postoperative image. This process may be repeated until the preoperative image substantially matches or is aligned with the postoperative image. It will be appreciated that some surfaces, lines, and/or contours may not exactly match as the actual surgical result may differ from the planned surgical result. As such, the overlay may be based on aligning a predetermined number of matching features, one or more features in a known fixed position, and/or a percentage of matching features.

In embodiments where a registration between the preoperative and postoperative images has been obtained prior to overlaying the one or more features of the at least one preoperative image over the one or more features of the at least one postoperative image, the overlaying may be based on the registration. Also, features that appear in both the preoperative image and the postoperative image but that are known to be in a different pose in the postoperative image than in the preoperative image may be excluded from consideration and/or use for purposes of the step 310. Further, although the step 310 is described as overlaying the one or more features of the at least one preoperative image over the one or more features of the at least one postoperative image, in some embodiments of the present disclosure, the step 310 comprises overlaying the one or more features of the at least one postoperative image over the one or more features of the at least one preoperative image.

The method 300 also comprises automatically measuring, by the processor, a difference in at least one parameter of each of the one or more features to yield training data (step 312). In some embodiments, the measuring may be performed manually by a user. The difference is measured between the preoperative image and the postoperative image. The measurement of one or more parameters may be obtained automatically using a measurement algorithm such as the measurement algorithm 136 or based on user input received via a user interface such as the user interface 110. The measuring may include automatically identifying at least one reference (e.g., a dimension, an axis, an edge, a surface) useful for measuring the parameter in each of the preoperative and the postoperative image. Even where such a reference is not automatically identified, the measuring may comprise utilizing a reference against which a preoperative and postoperative pose of an instrument, tool, or anatomical element may be measured. Alternatively, the measuring may comprise measuring a distance, angle, or other parameter between any given feature as depicted in the preoperative image and as depicted in the postoperative image. Thus, for example, an angle of a pedicle screw may be measured in each of the preoperative image and the postoperative image relative to a vertical axis, and a difference between the angles may be determined by subtracting one from the other. In some embodiments, the step 310 is omitted, as the overlaid image is not necessary for measuring a difference in the at least one parameter. Alternatively, the difference may be measured directly by measuring an angle between the planned and implanted pedicle screws depicted in the overlaid image generated by the step 310.

The one or more parameters may be or include, for example, a position and/or orientation of one or more implants (e.g., pedicle screw(s)), a distance between an entry point and a pedicle base, a depth of insertion, or an angle. The one or more parameters may be determined automatically by the processor executing a measurement algorithm based on the surgical plan. For example, the surgical plan may identify a trajectory for inserting a pedicle screw into a vertebra, and/or a pose for the inserted pedicle screw. The trajectory and/or the pose may be received as input by the measurement algorithm (either directly or by analysis of the preoperative image). The measurement algorithm may be configured to measure the one or more parameters, including, for example, an angle of insertion, an entry point, and/or a depth of insertion of a pedicle screw.

The method 300 also comprises generating, by the processor, using artificial intelligence and based on the training data, a function for predicting the difference (step 314). The function may be generated automatically using one or more function algorithms such as the function algorithm 130. The function algorithm 130 may be or comprise, for example, a neural network or other machine learning architecture for generating one or more algorithms based on training data. In some embodiments, generating the function may include fitting a transfer function to the training data using a regression analysis.

In some embodiments, the training data may include historical data (e.g., data generated from pairs of preoperative and postoperative images obtained from completed surgical procedures). In other embodiments, the training data may additionally include results from using the function to predict at least one expected difference of an unexecuted plan (as described below in connection with the step 316). In further embodiments, the training data may include actual surgical results from executing a surgical plan for which the function was used to predict an expected difference. These actual surgical results may include images of a patient that the surgical plan was performed on. In some embodiments, the surgical plan may have been changed to improve the predicted expected difference. In yet further embodiments the training data may include a combination of historical data, results from using the function, and actual surgical results from executing the unexecuted plan. The measurements from historical data and/or actual surgical results that define the training data may be obtained using one or more of the steps 302-312.

The function may be based on or otherwise utilize a plurality of inputs. The plurality of inputs may be patient specific, surgeon specific, and/or system specific (e.g., navigation system, robotic system, imaging device, etc.). The plurality of inputs may include, for example, one or more of patient positioning (e.g., lateral or prone), surgical approach (e.g., minimally invasive, open, mini-open, and/or trans-muscular), angle of planned trajectory relative to vertebra axis, angle of planned trajectory relative to a bone surface, bony anatomy at a planned entry point, bone quality, screw type, screw type per trajectory, screw size, screw size per trajectory, an order in which trajectories are executed, type of bone mount platform, vertebra, vertebral level, and/or registration score. The plurality of inputs may also include a user and/or a number of similar surgeries performed by the user. Such user and/or number of similar surgeries may be received after prompting from the user and may enable tailoring of the training data to the user's surgical needs. The plurality of inputs may further include navigation system name and/or version, robotic system name and/or version, imaging device type, imaging device name, imaging device version, and/or any other such information.

The method 300 also comprises applying, by the processor, the function generated in step 314 to an unexecuted surgical plan (step 316). The function may be applied to the unexecuted surgical plan using a prediction algorithm such as the prediction algorithm 132. The prediction algorithm may use a statistical analysis (also referred to herein as a risk management analysis) to evaluate a likelihood or probability of occurrence of one or more outcomes. In some embodiments, the statistical analysis is a Monte Carlo analysis. In other embodiments, the statistical analysis may be any type of statistical or risk management analysis.

The unexecuted surgical plan may be received via a user interface (e.g., the user interface 110) and/or a communication interface (e.g., the communication interface 108) of a computing device (e.g., the computing device 102), and may be stored in a memory (e.g., the memory 106) of the computing device. In some embodiments, the unexecuted surgical plan may have been approved by a user. In other embodiments, the unexecuted surgical plan may have not been approved by a user. For example, the unexecuted surgical plan may be automatically generated or provided by a planning software. The unexecuted surgical plan may also include information about one or more surgical steps involving at least one instrument and/or tool. The information may include information about a target pose of the at least one instrument and/or tool. The information may also include at least one dimension of an instrument and/or tool, and/or of an anatomical element.

The unexecuted surgical plan may comprise all of the information utilized as an input for the function generated in the step 314. For example, the unexecuted surgical plan may comprise information about one or more of patient positioning (e.g., lateral or prone), surgical approach (e.g., minimally invasive, open, mini-open, and/or trans-muscular), angle of planned trajectory relative to vertebra axis, angle of planned trajectory relative to a bone surface, bony anatomy at a planned entry point, bone quality, screw type, screw type per trajectory, screw size, screw size per trajectory, an order in which trajectories are executed, type of bone mount platform, registration score, surgeon name, number of similar surgeries performed by surgeon, navigation system name and/or version, robotic system name and/or version, imaging device type, imaging device name, imaging device version, and/or any other such information.

Where the unexecuted surgical plan does not comprise information corresponding to one or more inputs of the function generated in the step 314, an average value may be substituted for the missing information, or a null value may be substituted for the missing information. In some embodiments, the missing information may result in a lower range of confidence or certainty for the outcome of the application of the function to the unexecuted surgical plan.

The method 300 also comprises predicting, by the processor, at least one expected difference between a planned surgical result described in the unexecuted surgical plan and an actual surgical result resulting from execution of the unexecuted plan (step 318). The predicting may result from the function being applied to the unexecuted surgical plan, which may or may not involve using a prediction algorithm such as the prediction algorithm 132. The predicting step (which may use the prediction algorithm) may include determining one or more parameters for which a difference will be predicted based on the unexecuted surgical plan. For example, the unexecuted surgical plan may comprise a plan for implanting at least one pedicle screw and the one or more parameters for which a difference is predicted may include, for example, an angle of insertion, an entry point, and/or a depth of insertion based on the step of inserting a pedicle screw.

The method 300 also comprises updating, by the processor, the unexecuted plan based on the expected difference (step 320). In some embodiments, the unexecuted plan may be automatically updated. The updating may include applying at least one change to the unexecuted plan. The at least one change may be applied to one or more surgical steps. The at least one change may include one or more of a change in tool(s) and/or instrument(s) to use in the unexecuted plan, a change of tool and/or of instrument trajectory, a change in an insertion point of a tool and/or instrument, a change in insertion depth of a tool and/or instrument, or the like. The at least one change may lead to a further change by a surgeon or other user in tool and/or instrument selection. For example, the surgeon may select a different tool in the unexecuted plan based on the at least one change. The change may be identified and applied based on the result of the step 318, and may be intended to reduce or eliminate a predicted difference between a planned surgical result and an actual surgical result. In some embodiments, the user may be prompted to approve of the at least one change.

Once the surgical plan has been updated, the steps 316 and 318 may be repeated with respect to the updated unexecuted surgical plan to determine whether the predicted difference has in fact been reduced or minimized. In some embodiments, the steps 316 through 320 may be repeated multiple times to identify an updated surgical plan with the least predicted difference, or with a desirable combination of a reduced predicted difference and one or more changes to the surgical plan that are satisfactory or otherwise acceptable to a surgeon or other user.

The unexecuted plan may be automatically updated based on at least one predetermined threshold corresponding to the at least one change. In some embodiments, the predetermined threshold may be based on input received from a surgeon or user. In other embodiments, the predetermined threshold may be automatically determined based on one or more historical plans. The one or more historical plans may have at least one surgical step substantially similar to or the same as a corresponding surgical step of the unexecuted plan. In the same embodiments, the surgical step of the unexecuted plan may be updated or changed based on the at least one surgical step of the one or more historical plans. The change may be based on similarities in inputs of the unexecuted plan and the one or more historical plans (e.g., patient data may be similar to or the same as each other; a robotic, navigational, and/or imaging system may be similar to or the same as each other; etc.). By way of example, the at least one predetermined threshold may be an angle of a pedicle screw and the corresponding change may be determined to be a change in an insertion angle of the pedicle screw. Thus, when a predicted difference between a planned angle of a pedicle screw of an unexecuted plan and a predicted angle of the pedicle screw (e.g., if the unexecuted plan were to be carried out) meets the threshold, an insertion angle of the pedicle screw may be automatically changed to yield a predicted difference that is below the threshold. In some embodiments, one change may result in or necessitate another change. Thus, for example, changing a planned insertion angle of a pedicle screw may precipitate a needed change in the insertion depth of the pedicle screw, which needed change may be recognized and/or made automatically or manually.

The method 300 also comprises generating, by the processor, a notification (step 322). The notification may be a visual notification, an audible notification, or any type of notification communicated to a user. The notification may be communicated to the user via a user interface such as the user interface 110. In some embodiments, the notification may be automatically generated by the processor 104. In other embodiments, the notification may be automatically generated by any component of a system such as the system 100.

In some embodiments, the notification is based on the at least one expected difference determined in the step 318. The notification may be based on a predetermined threshold difference for each expected difference. The threshold difference may correlate to a maximum allowable difference for each expected difference and the notification may be generated when at least one expected difference meets or exceeds the corresponding threshold difference. The threshold difference may be determined automatically using artificial intelligence and training data (e.g., historical cases) in some embodiments. In other embodiments, the threshold difference may be or comprise, or be based on, surgeon input received via the user interface. In further embodiments, the threshold difference may be determined automatically using artificial intelligence, and may thereafter be reviewed and approved (or modified) by a surgeon or other user. In examples where the at least one expected difference comprises a plurality of expected differences, a notification may be generated for each expected difference that meets or exceeds the corresponding threshold difference. The notification may alert a surgeon or user of an expected difference that the surgeon or other user may wish to avoid or otherwise mitigate.

In other embodiments, the notification is based on the updated plan of the step 320. The notification may include at least one change to the updated plan communicated to a surgeon or other user. The notification may include a prompt to accept or decline the at least one change in the updated plan. The at least one change may be based on the predetermined threshold difference, described above. In other words, generating the notification may include identifying that an expected difference has met a threshold difference and determining a change to the unexecuted surgical plan based on the expected difference meeting the threshold difference. The change may comprise adjusting a parameter and/or a step of the surgical plan to reduce the expected difference to below the threshold difference, and may be presented to the surgeon to accept or decline.

The method 300 also comprises determining, using artificial intelligence and the training data, a weight for each parameter of the at least one parameter (step 324). Determining the weight for each parameter may be based on the training data and may be or comprise part of the step 314. As previously described, the training data may include historical data. In other embodiments, the training data may include results from using the function to predict at least one expected difference based on an unexecuted plan obtained from step 316. In further embodiments, the training data may include actual surgical results from executing the unexecuted plan after a difference has been predicted. The unexecuted plans may include updated plans that have been modified to improve the predicted expected difference. In yet further embodiments the training data may include a combination of historical data, results from using the function, and actual surgical results from executing the unexecuted plan. The measurements from the historical data and/or the actual surgical results that define the training data may be obtained using one or more of the steps 302-312.

The training data may be used to determine a magnitude of an effect of the parameter on a result of applying the function. For example, a first parameter that causes a change in the result greater than a second parameter may be assigned a higher weight. Conversely, if the first parameter causes a change in the result less than the second parameter, then the first parameter may be assigned a lower weight than the second parameter.

The weight may also be based on one or more types of input such as patient input (e.g., patient specific data), system(s) input (e.g., type of system(s) used or planned to be used during a surgical procedure), or a surgeon's input (e.g., surgeon history, preference(s) and/or experience). The types of systems may include one or more of or a combination of a robotic system and/or a navigational system. The surgeon's input may include one or more types of tool(s) and/or instrument(s) to be used during execution of the surgical plan.

The method 300 also comprises determining, using artificial intelligence and the training data, at least one unessential parameter to remove from the plurality of parameters (step 326). In some embodiments, the at least one unessential parameter comprises one or more parameters that do not affect a result of the function. In other embodiments, the unessential parameter may be a parameter that does not substantially affect a result of the function. An unessential parameter that does not substantially affect a result of the function may be a parameter which does not affect the result of the function sufficiently to necessitate a change or update to a surgical plan based on the unessential parameter. In other words, the unessential parameter may affect the result, but proportionally compared to other parameters may not affect the result enough to change or update a surgical plan based on the unessential parameter. Removing unessential parameters from the plurality of parameters may beneficially decrease an amount of processing required to determine the function or to use the function, thereby improving processing time.

In some embodiments, the unessential parameter may be based on the weight determined in step 324. A parameter with a lower weight than other parameters (whether based on a direct comparison of the parameter weights or using a predetermined formula) may be determined to be unessential. Determining the unessential parameter based on weight may also be based on a weight threshold. For example, a parameter may be deemed unessential if a weight of the parameter does not meet the weight threshold.

As may be appreciated based on the foregoing disclosure, the present disclosure encompasses methods with fewer than all of the steps identified in FIG. 3 (and the corresponding description of the method 300), as well as methods that include additional steps beyond those identified in FIG. 3 (and the corresponding description of the method 300) and/or that include one or more steps other than those identified in FIG. 3 (and the corresponding description of the method 300). One or more steps of the methods described herein may be performed in an order other than the order in which they are described herein.

Methods and systems for predicting surgical outcomes beneficially provide for improvements in surgical planning. By determining a function based on measurements taken from training data (such as historical data) to predict one or more differences in an unexecuted surgical plan, the unexecuted surgical plan may be updated or modified to improve an outcome of the surgical plan. Modifications may include selecting a different tool and/or instrument and may be used to guide a surgeon in tool and/or instrument selection. In scenarios where the one or more predicted differences do not affect or do not substantially affect an outcome of the surgical plan, the predicating may confirm that the unexecuted surgical plan is appropriate to achieve a desired outcome. As such, the function may be used to improve or confirm an unexecuted surgical plan.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for predicting surgical outcomes, comprising:
receiving, by a processor, a surgical plan comprising information about a planned surgery and at least one preoperative image depicting a planned surgical result;
receiving, by the processor, at least one postoperative image depicting an actual surgical result resulting from execution of the planned surgery;
registering, by the processor, the postoperative image to the preoperative image;
automatically identifying, by the processor using feature recognition, one or more features in each of the postoperative image and the preoperative image;
automatically measuring, by the processor, a difference between a value of a parameter of a feature in the postoperative image and the value of the parameter of the feature in the preoperative image to yield training data, wherein the difference comprises at least one of a distance and an angle;
generating, by the processor, using artificial intelligence and based on the training data, a function for predicting the difference, wherein generating the function comprises fitting a transfer function to the training data using regression analysis;
determining, using artificial intelligence and the training data, at least one unessential parameter to remove from a plurality of parameters, wherein each of the at least one unessential parameter does not affect a result of the function, and wherein the at least one unessential parameter comprises at least one of the distance and the angle;
predicting, by the processor using the function and based on an unexecuted surgical plan, an expected difference between the value of the parameter of the feature within a planned surgical result described in the unexecuted surgical plan and the value of the parameter of the feature in an actual surgical result resulting from execution of the unexecuted surgical plan; and
updating, by the processor, the unexecuted surgical plan to apply at least one change based on the predicted expected difference to reduce the predicted expected difference for the value of the parameter of the feature within the actual surgical result,
wherein the at least one change comprises at least one of a change in a tool to use in the unexecuted surgical plan, a change in a tool trajectory, a change in an insertion point of a tool, and/or a change in insertion depth of a tool.

2. The method of claim 1, further comprising:
generating, by the processor, a notification based on the predicted expected difference, the notification being at least one of an audible notification or a visual notification.

3. The method of claim 1, further comprising:
generating, by the processor, a notification based on the updated unexecuted surgical plan, the notification including a prompt to accept or decline the at least one change in the updated unexecuted surgical plan.

4. The method of claim 1, wherein the unexecuted surgical plan is automatically updated based on pre-authorized historical plans, the historical plans having at least one surgical step substantially similar to the at least one change in the updated unexecuted surgical plan.

5. The method of claim 1, wherein the measuring includes automatically determining the value of the parameter of the feature based on the surgical plan.

6. The method of claim 1, wherein the measuring includes automatically identifying at least one location to measure the difference between the value of the parameter of the feature in the postoperative image and the value of the parameter of the feature in the preoperative image.

7. The method of claim 1, wherein the identifying further uses segmentation.

8. The method of claim 1, wherein the feature comprises at least one of one or more implants or one or more anatomical elements.

9. The method of claim 1, wherein the value of the parameter of the feature comprises at least one of a position or an orientation of at least one of one or more implants or one or more tools.

10. The method of claim 1, further comprising:
determining, using artificial intelligence and the training data, a weight for the value of the parameter of the feature.

11. The method of claim 1, wherein the function is based on a plurality of inputs.

12. The method of claim 1, wherein the registering includes overlaying a depiction of the feature from the at least one postoperative image over a depiction of the feature from the at least one preoperative image.

13. A method for predicting surgical outcomes comprising:
receiving, by a processor, at least one preoperative image depicting a planned surgical result and at least one postoperative image depicting an actual surgical result;
identifying, by the processor using feature recognition, one or more features in each of the postoperative image and the preoperative image;
overlaying, by the processor, the one or more features of the at least one preoperative image over the one or more features of the at least one postoperative image;
measuring, by the processor, a difference between a value of a parameter of a feature in the postoperative image and the value of the parameter of the feature in the preoperative image to yield training data, wherein the difference comprises at least one of a distance and an angle;
generating, by the processor using artificial intelligence and based on the training data, a function for predicting the difference, wherein generating the function comprises fitting a transfer function to the training data using regression analysis;
determining, using artificial intelligence and the training data, at least one unessential parameter to remove from a plurality of parameters, wherein each of the at least one unessential parameter does not affect a result of the function, and wherein the at least one unessential parameter comprises at least one of the distance and the angle;
predicting, by the processor using the function and based on an unexecuted surgical plan, an expected difference between the value of the parameter of the feature within a planned surgical result described in the unexecuted surgical plan and the value of the parameter of the feature in an actual surgical result resulting from execution of the unexecuted surgical plan; and
updating, by the processor, the unexecuted surgical plan to apply at least one change based on the predicted expected difference to reduce the predicted expected difference for the value of the parameter of the feature within the actual surgical result,
wherein the at least one change comprises at least one of a change in a tool to use in the unexecuted surgical plan, a change in a tool trajectory, a change in an insertion point of a tool, and/or a change in insertion depth of a tool.

14. The method of claim 13, further comprising:
generating, by the processor, a notification based on the updated unexecuted surgical plan, the notification including a prompt to accept or decline the at least one change in the updated unexecuted surgical plan.

15. The method of claim 13, wherein the unexecuted surgical plan is automatically updated based on pre-authorized historical plans, the historical plans having at least one surgical step substantially similar to the at least one change in the updated unexecuted surgical plan.

16. A system for predicting surgical outcomes comprising:
at least one processor; and
at least one memory storing instructions for execution by the at least one processor that, when executed, cause the at least one processor to:
receive a surgical plan comprising information about a planned surgery and at least one preoperative image depicting a planned surgical result;
receive at least one postoperative image depicting an actual surgical result resulting from execution of the planned surgery;
register the postoperative image to the preoperative image;
identify, using feature recognition, one or more features in each of the postoperative image and the preoperative image;
measure a difference between a value of a parameter of a feature in the postoperative image and the value of the parameter of the feature in the preoperative image to yield training data, wherein the difference comprises at least one of a distance and an angle;
generate, using artificial intelligence and based on the training data, a function for predicting the difference, wherein generating the function comprises fitting a transfer function to the training data using regression analysis;
determine, using artificial intelligence and the training data, at least one unessential parameter to remove from a plurality of parameters, wherein each of the at least one unessential parameter does not affect a result of the function, and wherein the at least one unessential parameter comprises at least one of the distance and the angle;
predict, using the function and based on an unexecuted surgical plan, an expected difference between the value of the parameter of the feature within a planned surgical result described in the unexecuted surgical plan and the value of the parameter of the feature in an actual surgical result resulting from execution of the unexecuted surgical plan; and
update, by the processor, the unexecuted surgical plan to apply at least one change based on the predicted expected difference to reduce the predicted expected difference for the value of the parameter of the feature within the actual surgical result,
wherein the at least one change comprises at least one of a change in a tool to use in the unexecuted surgical plan, a change in a tool trajectory, a change in an insertion point of a tool, and/or a change in insertion depth of a tool.

17. The system of claim 16, wherein the at least one memory stores instructions for execution by the at least one processor that, when executed, cause the at least one processor to:
- compare the predicted expected difference to a predetermined threshold; and
- update the unexecuted surgical plan to apply the at least one change when the predicted expected difference between the planned surgical result and the actual surgical result exceeds the predetermined threshold.

* * * * *